United States Patent
Mitchell (10) Patent No.: US 10,245,981 B2
(45) Date of Patent: Apr. 2, 2019

(54) CHILD'S BOOSTER SEAT WITH DETACHABLE BELT POSITIONER CAR SEAT

(71) Applicant: GRACO CHILDREN'S PRODUCTS INC., Atlanta, GA (US)

(72) Inventor: Thomas Jake Mitchell, Atlanta, GA (US)

(73) Assignee: GRACO CHILDREN'S PRODUCTS INC., Atlanta, GA (US)

( * ) Notice: Subject to any disclaimer, the term of this patent is extended or adjusted under 35 U.S.C. 154(b) by 0 days.

(21) Appl. No.: 15/478,955

(22) Filed: Apr. 4, 2017

(65) Prior Publication Data

US 2017/0282758 A1    Oct. 5, 2017

Related U.S. Application Data

(60) Provisional application No. 62/318,452, filed on Apr. 5, 2016.

(51) Int. Cl.
*B60N 2/28* (2006.01)

(52) U.S. Cl.
CPC ......... *B60N 2/2866* (2013.01); *B60N 2/2803* (2013.01); *B60N 2/2851* (2013.01)

(58) Field of Classification Search
CPC ... B60N 2/2866; B60N 2/2803; B60N 2/2851
USPC ..................................................... 297/250.1
See application file for complete search history.

(56) References Cited

U.S. PATENT DOCUMENTS

| | | |
|---|---|---|
| 4,568,122 A | 2/1986 | Kain |
| 5,183,311 A | 2/1993 | Meeker et al. |
| 5,568,959 A | 10/1996 | Weber et al. |
| 5,599,060 A | 2/1997 | Stephens et al. |
| 5,609,367 A | 3/1997 | Eusebi et al. |
| 5,609,389 A | 3/1997 | Longoria et al. |

(Continued)

FOREIGN PATENT DOCUMENTS

| | | |
|---|---|---|
| AU | 2011200851 A1 | 9/2011 |
| CN | 1091091 A | 8/1994 |

(Continued)

OTHER PUBLICATIONS

Office Action issued in Chinese Application No. 201710218715.8, dated Nov. 2, 2018, 9 pages.

*Primary Examiner* — Mark R Wendell
(74) *Attorney, Agent, or Firm* — Eversheds Sutherland (US) LLP (57) ABSTRACT

A child's booster seat with detachable belt positioner car seat is provided. The booster seat can include a seat back that can be coupled and decoupled from a seat base. The seat base can include a primary seat base and a removable seat base. The removable seat base can be coupled and decoupled from the primary seat base and used as a booster seat for a child without the primary seat base. The primary seat base can include protrusions and/or recesses and the removable seat base can include recesses and/or bosses for aligning and/or coupling the removable seat base to the primary seat base. A pair of armrests can be adjustably coupled to the seat base, such as to the removable seat base. The seat base can further include one or more lap belt positioners. The seat back can include an adjustable headrest and one or more shoulder belt positioners.

19 Claims, 8 Drawing Sheets

(56) References Cited

U.S. PATENT DOCUMENTS

| | | | |
|---|---|---|---|
| 5,797,654 A | 8/1998 | Stroud | |
| 5,829,834 A | 11/1998 | Silverman | |
| 5,845,967 A * | 12/1998 | Kane | B60N 2/2806 24/129 B |
| 6,000,753 A * | 12/1999 | Cone, II | B60N 2/2806 297/253 |
| 6,079,772 A | 6/2000 | Green | |
| 6,139,101 A * | 10/2000 | Berringer | B60N 2/2821 297/256.1 |
| 6,193,312 B1 * | 2/2001 | Yoshida | B60N 2/2806 297/250.1 |
| 6,390,345 B1 | 5/2002 | Brown et al. | |
| 6,692,072 B2 | 2/2004 | Nelson et al. | |
| 6,908,151 B2 | 6/2005 | Meeker et al. | |
| 7,004,362 B2 | 2/2006 | Boone | |
| 7,090,294 B2 * | 8/2006 | Balensiefer, II | B60N 2/2806 297/256.13 |
| 7,188,899 B1 | 3/2007 | McClellan-Derrickson | |
| 7,229,132 B2 | 6/2007 | Meeker et al. | |
| 7,293,792 B2 | 11/2007 | Wilson | |
| 7,300,113 B2 | 11/2007 | Baloga et al. | |
| 7,374,241 B2 | 5/2008 | Gold et al. | |
| 7,422,276 B2 | 9/2008 | Flannery | |
| 7,488,038 B2 | 2/2009 | Boyle et al. | |
| 7,571,961 B2 | 8/2009 | Gold et al. | |
| 7,611,205 B2 | 11/2009 | Chen et al. | |
| 7,637,568 B2 | 12/2009 | Meeker et al. | |
| 7,735,921 B2 * | 6/2010 | Hutchinson | B60N 2/2806 297/256.13 |
| 7,748,788 B2 | 7/2010 | Yumoto et al. | |
| 7,837,267 B2 | 11/2010 | Zink et al. | |
| 7,850,236 B2 | 12/2010 | Chen et al. | |
| 7,857,385 B2 | 12/2010 | Zink et al. | |
| 8,182,034 B2 | 5/2012 | Glance | |
| D672,996 S | 12/2012 | Kelly | |
| 8,403,413 B2 | 3/2013 | Scott | |
| D696,523 S | 12/2013 | Presman et al. | |
| 8,646,838 B2 | 2/2014 | Fiore, Jr. et al. | |
| 8,678,499 B2 | 3/2014 | Kelly | |
| D746,071 S * | 12/2015 | Haley | D6/333 |
| 9,332,815 B2 | 5/2016 | Sumroy et al. | |
| 9,376,088 B2 | 6/2016 | Sumroy | |
| 2002/0000744 A1 | 1/2002 | Maciejczyk | |
| 2003/0192925 A1 | 10/2003 | Boone | |
| 2004/0074937 A1 | 4/2004 | Thomas | |
| 2004/0100046 A1 | 5/2004 | Darling | |
| 2004/0195283 A1 | 10/2004 | Zebraski | |
| 2004/0245822 A1 | 12/2004 | Balensiefer, II et al. | |
| 2007/0236061 A1 | 10/2007 | Meeker et al. | |
| 2008/0135593 A1 | 6/2008 | Munther | |
| 2008/0277984 A1 | 11/2008 | Carine | |
| 2012/0292963 A1 | 11/2012 | Sedlack | |
| 2013/0200671 A1 * | 8/2013 | Herzberg | B60N 2/28 297/250.1 |
| 2013/0300169 A1 | 11/2013 | Lu et al. | |
| 2014/0152072 A1 | 6/2014 | Sumroy | |
| 2015/0052709 A1 | 2/2015 | Sumroy | |
| 2018/0194252 A1 | 7/2018 | Sack et al. | |

FOREIGN PATENT DOCUMENTS

| | | |
|---|---|---|
| CN | 201217398 Y | 4/2009 |
| CN | 205022401 U | 2/2016 |
| CN | 205344587 U | 6/2016 |
| DE | 102010038009 A1 | 4/2012 |
| EP | 2077082 B1 | 8/2010 |
| EP | 2311685 A3 | 5/2016 |
| FR | 2911547 A3 | 7/2008 |
| FR | 2990900 A1 | 11/2013 |
| GB | 2456152 A | 7/2009 |
| GB | 2474438 A | 4/2011 |
| GB | 2478783 A | 9/2011 |
| GB | 2527137 A | 12/2015 |
| GB | 2532946 A | 6/2016 |
| WO | 2005/079159 A2 | 9/2005 |

* cited by examiner

CHILD'S BOOSTER SEAT WITH DETACHABLE BELT POSITIONER CAR SEAT

RELATED APPLICATIONS

This application claims priority under 35 U.S.C. § 119 to U.S. Provisional Patent Application No. 62/318,452 filed Apr. 5, 2016, and titled "CHILD'S BOOSTER SEAT WITH DETACHABLE BELT POSITIONER CAR SEAT," the entire contents of which are hereby incorporated herein by reference for all purposes.

FIELD OF THE DISCLOSURE

The present disclosure is generally directed to child safety seats and more particularly to a child safety seat with a removable booster and car seatbelt positioner.

BACKGROUND

Child safety seats are well known in the art. The typical child safety seat is designed to rest on the top surface of the seat of a vehicle. The child safety seat is configured for the child to sit on the child safety seat such that the position of the child is raised in the vehicle. Many of these types of child safety seats are booster seats for toddlers. Commonly, booster seats have a seat base and a seat back. The typical booster seat rests on the vehicle seat but the vehicle's safety harness (e.g., seatbelt) is used to secure the seat occupant (e.g., a child) in the booster seat as well as the seat the booster seat sits on. The seat back on some booster seats is removable, converting the seat to a seat base-only booster for larger children. The booster seat not only more closely fits the child's smaller body size, but also elevates the child to aid in properly positioning the child with respect to the seatbelt.

Seatbelts, also known as safety belts, are safety devices designed to secure and restrain vehicle occupants preventing harmful movement during a collision or sudden stop. Seatbelts come in various types, including lap restraints, sash belts, and three-point seatbelts combining the lap belt and the sash belt in to a unitary device. In most modern vehicles the three-point seatbelt is standard. Three-point seatbelts typically consist of a retractable webbing that is removably secured to a buckle on one side of the passenger, and a retractable locking reel or drum on the passenger's other side, either near the passenger's shoulder or at seat level. As standard car seatbelts are configured for adults of various sizes and heights, they are accordingly improperly sized for children. As such, devices to properly position the seatbelt across the child's body are required. In some booster seats this is achieved utilizing elements or features of the booster seat, while other products may utilize additional elements to achieve the proper positioning.

Booster seats are often moved from car to car or used in different vehicles. Booster seats are also often taken on trips where the booster seat is used on an airplane for the child and then used in a rental car during the family's time away. Some conventional booster seats include an exterior shell that is a one-piece structure that includes both the seat back and seat base. These types of booster seats can be fairly cumbersome for transport and travel. In other conventional booster seats, the seat back can be removed from the seat base and the seat back and seat base can be carried and transported separately. However, this can also be rather cumbersome, as the two components, if detached, must be separately managed, carried, stored, and transported apart from one-another. Alternatively, some booster seats have a back that pivots in relation to the seat base, allowing for a more compact folded configuration for transportation. As a child gets older, only the seat base portion of the child safety seat may be needed as a booster seat. The seat base can still be cumbersome to hold and carry, especially while trying to carry other things, such as travel bags, shopping bags, a child, or the like.

Other manufacturers have attempted to address this issue by providing seating surfaces that incorporate loops, hooks, and clips to alter the positioning of the seatbelt with respect to the position of the child's body without requiring the use of a full booster seat. Unfortunately, these can be cumbersome to operate and properly align and provide a limited number of configurations without purchasing multiple safety seats or devices.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION OF THE EXAMPLE EMBODIMENTS

Example embodiments will now be described more fully hereinafter with reference to the accompanying drawings, in which example embodiments are shown. The concepts disclosed herein may, however, be embodied in many different forms and should not be construed as limited to the example embodiments set forth herein; rather, these embodiments are provided so that this disclosure will be thorough and complete, and will fully convey the scope of the concepts to those skilled in the art. Like numbers refer to like, but not necessarily the same or identical, elements throughout.

Certain dimensions and features of the example child safety seat are described herein using the term "approximately." As used herein, the term "approximately" indicates that each of the described dimensions is not a strict boundary or parameter and does not exclude functionally similar variations therefrom. Unless context or the description indicates otherwise, the use of the term "approximately" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

In addition, certain relationships between dimensions of the child safety seat and between features of the child safety seat are described herein using the term "substantially." As used herein, the terms "substantially" and "substantially equal" indicates that the equal relationship is not a strict relationship and does not exclude functionally similar variations therefrom. Unless context or the description indicates otherwise, the use of the term "substantially" or "substantially equal" in connection with two or more described dimensions indicates that the equal relationship between the dimensions includes variations that, using mathematical and industrial principles accepted in the art (e.g., rounding, measurement or other systematic errors, manufacturing tolerances, etc.), would not vary the least significant digit of the dimensions. As used herein, the term "substantially constant" indicates that the constant relationship is not a strict relationship and does not exclude functionally similar variations therefrom. As used herein, the term "substantially parallel" indicates that the parallel relationship is not a strict relationship and does not exclude functionally similar variations therefrom.

Figure 1:
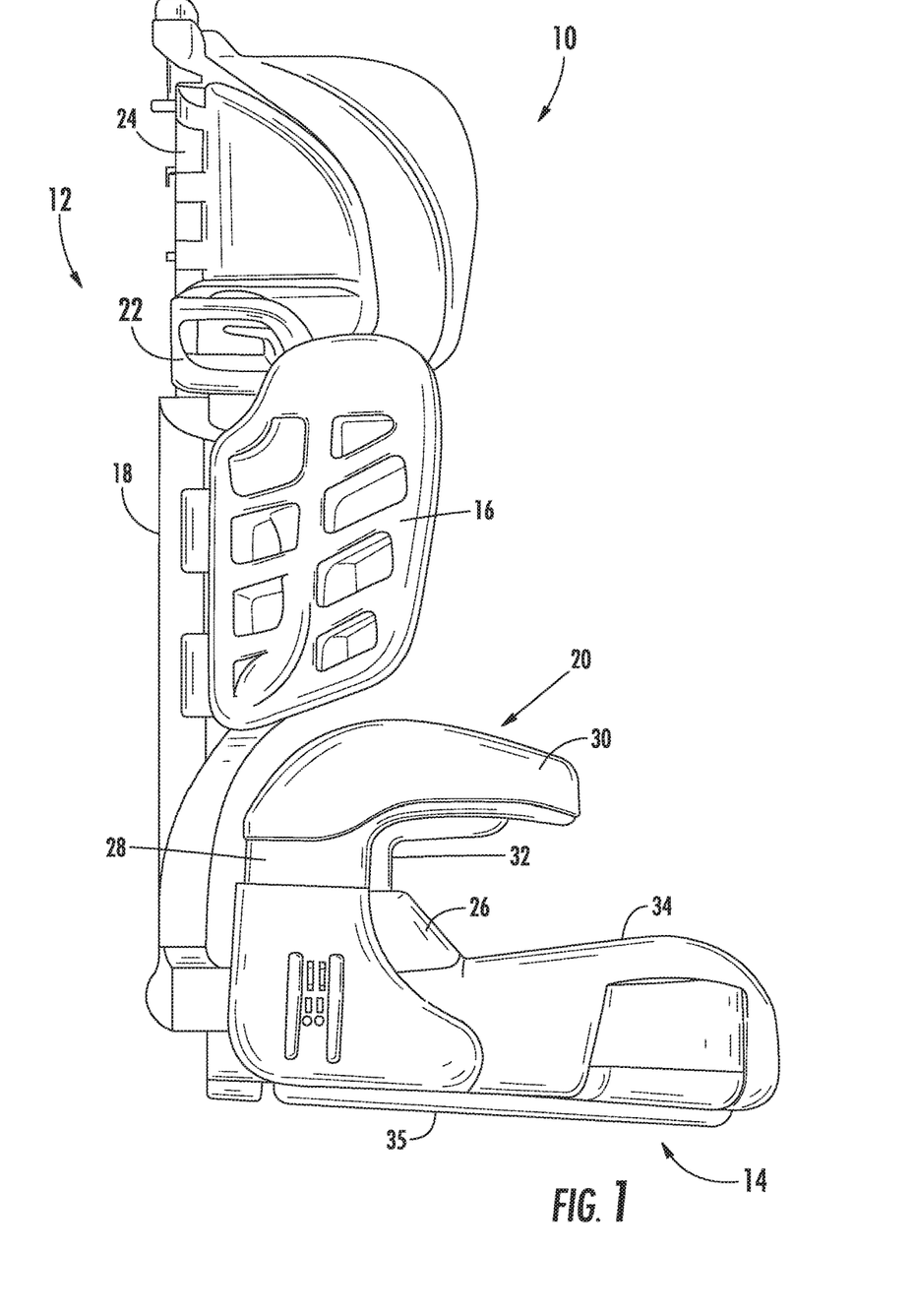
FIG. 1 is a side elevation view of one example of a child safety seat constructed in accordance with one example embodiment of the disclosure.
Figure 2:
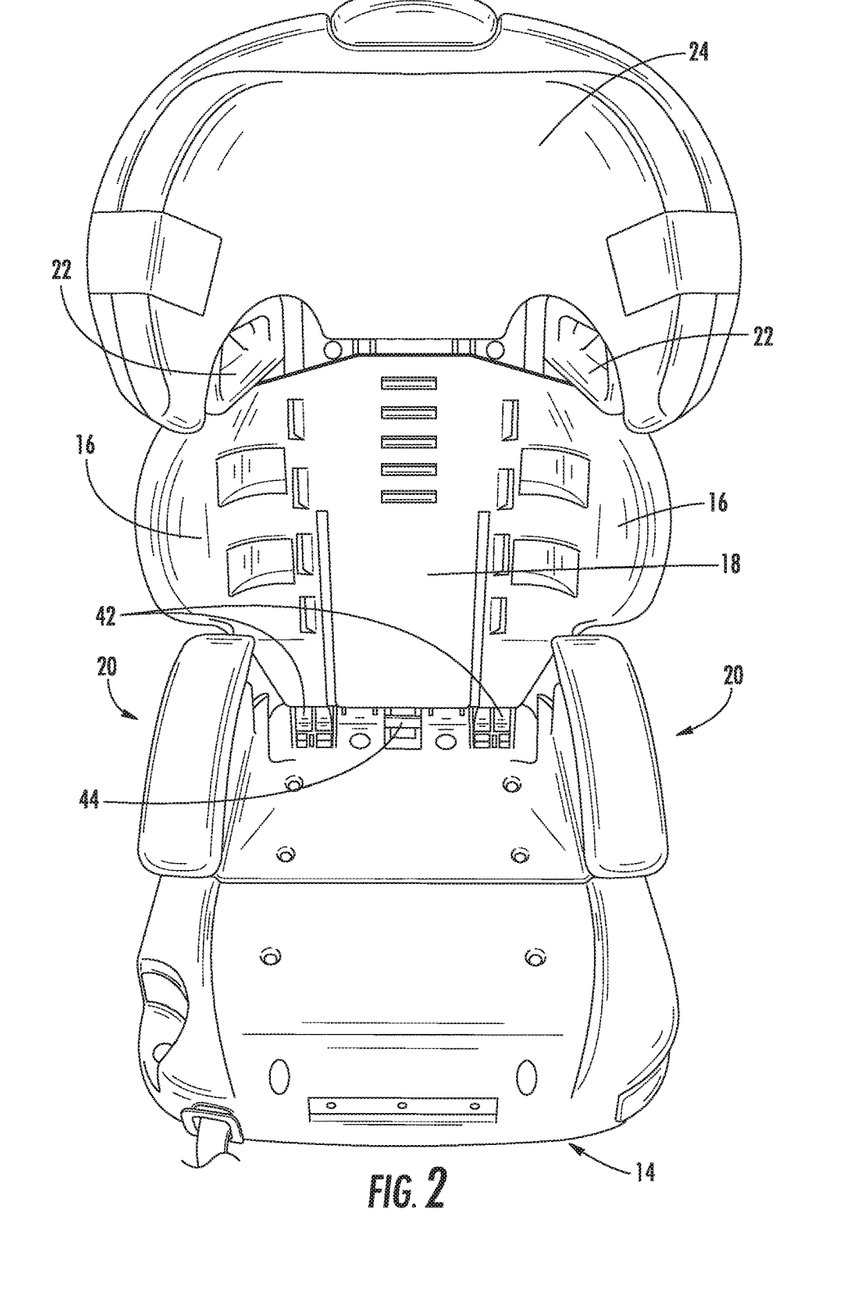
FIG. 2 is a front elevation view of the child safety seat of FIG. 1 constructed in accordance with one example embodiment of the disclosure.

FIG. 1 is a side elevation view of one example of a child safety seat 10 constructed in accordance with one example embodiment of the disclosure. FIG. 2 is a front elevation view of the child safety seat 10 of FIG. 1 constructed in accordance with one example embodiment of the disclosure. Now referring to FIGS. 1 and 2, the example child safety seat 10 can include a seat back 12 and seat base 14. In some example embodiments, the seat back 12 and seat base 14 may be formed as one unitary piece. In other example embodiments, the seat back 12 and seat base 14 may be formed from two or more separate pieces that are joined together during manufacturing. The seat back 12 may be fixedly, removably, and/or rotatably coupled to the seat base 14.

The seat base 14 can include a top surface 34 and an opposing bottom surface 35. The bottom surface 35 can be configured to rest upon the top surface of the vehicle seat. The top surface 34 is configured to be sat upon by a child. The top surface 34 can be angled downward from front to back to better position the child within the child safety seat 10. All or a portion of the top surface 34 can also be covered in padding and/or soft goods (e.g., fabric, vinyl, plastic, leather, faux leather, etc.) to increase the comfort of the top surface of the seat base 14.

The seat back 12 can include a backrest 18 that extends generally vertically upward with respect to the seat base 14. The backrest 18 can include a front side and opposing back side. The front side of the backrest 18 can be configured to receive a portion of a child's back thereon. All or a portion of the backrest 18 can include padding and/or soft goods (e.g., fabric, vinyl, plastic, leather, faux leather, etc.) to increase the comfort of the front side of the backrest 18.

In some example embodiments, the seat back 12 may contain a pair of lateral supports 16. Each lateral support 16 can be positioned along opposing, vertically extending side edges of the seat back 12. Each lateral support 16 can be integrally formed with or coupled to the seat back 12. Each lateral support 16 can extend along a portion of the vertical edge of the seat back 12 and generally between the seat base 14 and the headrest. Each lateral support 16 can also extend from the backrest 18 of the seat back 12 and generally forward from the front-facing portion of the backrest 18 to help keep the child securely positioned within the outer boundaries of the child safety seat 10 during lateral acceleration or deceleration.

In addition, the child safety seat 10 can also include a pair of armrests 20. In some example embodiments, each armrest 20 may be coupled to the seat base 14 and can extend generally vertically upward from the seat base 14. In certain example embodiments, each armrest 20 can be positioned along opposing lateral sides of the seat base 14. In one example, the armrest 20 can include a vertical support member 28 that has a first end coupled to the seat base 14 and extends vertically upwardly from the seat base 14. The armrest 20 can further include a horizontal support member 30 coupled to or integrally formed with the vertical support member 28. The example horizontal support member 30 can be positioned along the top end of the vertical support member and extend horizontally out therefrom to provide a larger contact area for the child's arm to rest on. In one example, the horizontal support member 30 can be vertically adjustable with respect to the vertical support member 28 to allow the armrest 20 to be raised and lowered. In addition, the horizontal support member 30 can include padding and/or soft goods (e.g., fabric, vinyl, plastic, leather, faux leather, etc.) at least along the top side of the horizontal support member 30 to provide additional comfort. In alternative example embodiments, the armrests 20 may be coupled to the seat back 12 and extend generally forward from the seat back 12.

The child safety seat 10 may also include elements that guide and position the vehicle's three-point seatbelt (not shown). In one example embodiment, the child safety seat 10 includes a shoulder belt guide 22. Each shoulder belt guide 22 can be positioned along the seat back 12 near or adjacent the headrest 24 and generally above the lateral support 16 so as to be positioned near each of the occupant's shoulders as shown in FIG. 2. The shoulder belt guide 22 may be coupled to or integrally formed with the seat back 12, the backrest 18, or the headrest 24 and can be positioned between the bottom of the seat back 12 and the top of the seat back 12. The shoulder belt guide 22 may include a channel, for example an oblong channel, that the seatbelt can pass freely therethrough. In some example embodiments, the outer wall of the shoulder belt guide 22 may have an opening or other break in the wall to allow the seatbelt to be fed into the channel of the shoulder belt guide 22 while making it difficult for the belt to be unintentionally removed from the guide 22. Once the seatbelt is in place within the channel of the shoulder belt guide 22, the shoulder belt guide 22 can maintain the shoulder belt in the proper position across the child's torso while still allowing the belt to be extended and retracted during buckling and unbuckling of the child into the child safety seat 10. Other example embodiments of the child safety seat 10 may utilize different shoulder belt guide configurations. For example, a strap with one end fixed to the child safety seat 10 may be looped over the seatbelt with the other end removably snapped or coupled to the child safety seat 10. In other example embodiments, the shape of the headrest 24, backrest 18, and/or lateral supports 16 may provide an integrated pathway to guide and secure the shoulder belt.

Figure 6:
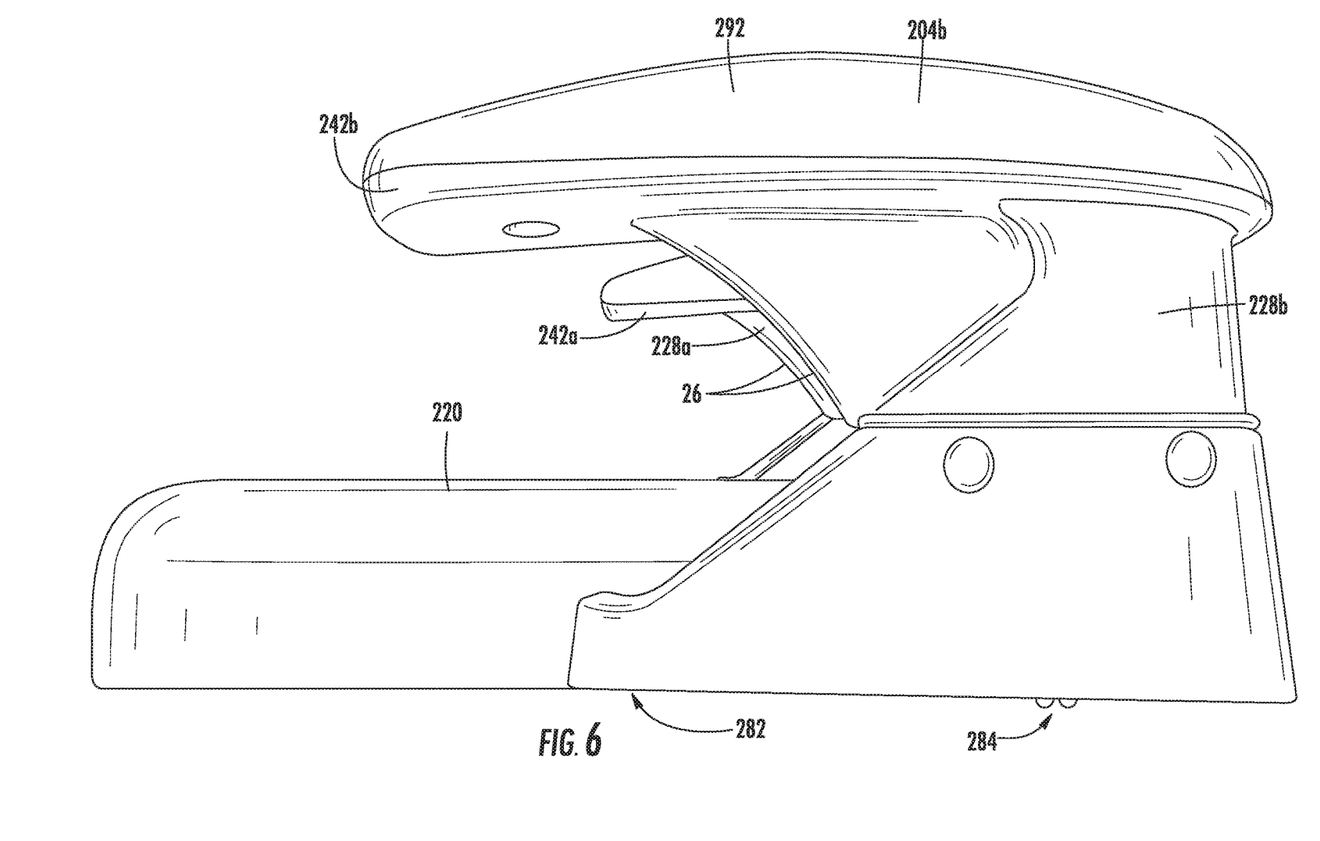
FIG. 6 is a side elevation view of the removable base of FIG. 5 constructed in accordance with one example embodiment of the disclosure.

The child safety seat 10 may also include one or more lap belt guides 26. Each lap belt guide 26 is configured to properly position the lap belt across the lap of the child when the child is sitting on the seat base 14 of the child safety seat 10. In certain example embodiments, each lap belt guide 26 is positioned adjacent to a corresponding armrest 20 and along the top surface 34 of the seat base 14, as described more fully below. In one example, the lap belt guide 26 creates a transition surface between a forward surface 32 of the vertical support 28 of the armrest 20 and a top surface 34 of the seat base 14 for properly positioning the lap belt (not shown). In some example embodiments, the lap belt guide 26 may be attached to or integrally formed as a part of the vertical support 28 of the armrest 20. In other example embodiments, the lap belt guide 26 may be attached to or integrally formed with at least a portion of the seat base 14. In another example embodiment, elements of the seat base 14 and vertical support 28 may combine to create the seat belt guide (for example, as shown in FIG. 6). In one example embodiment, the lap belt guide 26 may include a flat surface the belt extends over and abuts. In another example embodiment, the lap belt guide 26 may include additional features to secure or otherwise direct the lap belt.

In certain example embodiments, the seat back 12 may be adjustable to fit different occupants and vehicles. In one example, the seat back 12 may include a vertically adjustable headrest 24 that may be slidably or otherwise vertically adjustably coupled to the backrest 18 to fit occupants of different heights. The headrest 24 can include a lever configured to decouple the headrest 24 from the seat back 12 and allow the headrest 24 to be vertically adjusted up or down with respect to the seat back 12. Releasing the lever can then allow the headrest 24 to lock in one of multiple vertical positions along the seat back 12.

The child safety seat 10 can also include a seat back 12 that is selectively pivotally attached to the seat base 14, allowing the seat back 12 to be reclined at different seat back angles (with respect to the seat base 14). In certain example embodiments, the seat back 12 and seat base 14 may be selectively removable, allowing the seat base 14 to be separated from the seat back 12 so that the seat base 14 can be used as a booster seat without the seat back 12. For example, the seat back 12 may include one or more hooks 42 positioned along a bottom edge of the seat back 12 for removably and rotatably coupling the seat back 12 to the seat base 14. The seat base 14 can include one or more corresponding pins, bars, or axles 44 positioned along a back edge of the seat base 14 to which the one or more hooks of the seat back 12 can rotatably couple.

Figure 3:
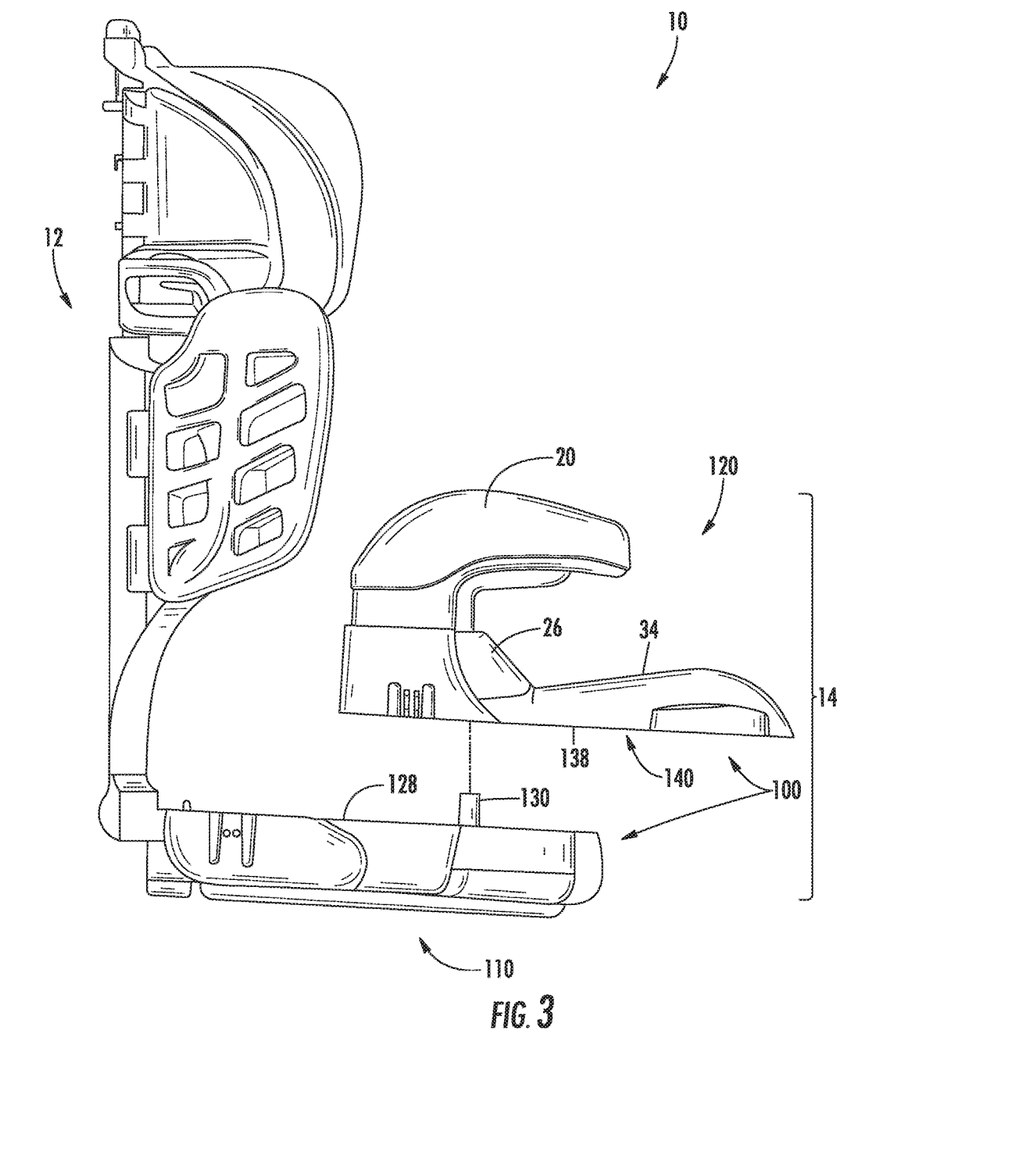
FIG. 3 is a side elevation view of one example of a child safety seat presented with the removable base removed in accordance with one example embodiment of the disclosure.

FIG. 3 is a side elevation view of one example of the child safety seat 10 presented with the removable base removed in accordance with one example embodiment of the disclosure. Referring now to FIGS. 1-3, in certain example embodiments, the seat base 14 may include a severable seat base 100 that includes a primary base 110 and a removable base 120 that can be separated from the primary base 110. Providing the ability to separate a portion of the seat base 14 from another portion of the seat base 14 can allow a parent or guardian of a child to detach and use the more compact removable base 120 without the need for the seat back 12 or remainder of the seat base 14. The removable base 120 can be only a portion of the overall seat base 14 and can have a more compact size than the combined primary base 110 and removable base 120. In addition, the removable base 120 can have a shorter vertical profile than the combined primary base 110 and removable base 120, such that the removable base 120 can be utilized when traveling, transferring between vehicles, or with children who require less height from their child safety seat 10. In certain example embodiments, both the removable base 120 and the primary base 110 can function independently as seating surfaces, and the primary base 110 may be used alone as a backless booster, or attached to the seat back 12.

In certain example embodiments, the removable base 120 has the same or substantially equal seat depth profile as the primary base 110. In one example embodiment, the primary base 110 can include one or more protrusions 130 that extend vertically upward from a top surface 128 of the primary base 110. The removable base 120 can include one or more corresponding recesses 140, cavities, or openings positioned along a bottom side 138 of the removably base. The protrusions 130 can mate with or otherwise be inserted into the corresponding recesses 140 disposed along a bottom side 138 of the removable base 120. For example, the recesses 140 may be positioned under or adjacent to the armrests 20. In certain example embodiments, the protrusions 130 may be used for aligning the removable base 120 onto the primary base 110 for coupling and decoupling the removable base 120 to the primary base 110.

In certain example embodiments, the protrusions 130 may also include features for securing the removable base 120 to the primary base 110. For example, the protrusions 130 and recesses 140 may be correspondingly sized and shaped so that each protrusion 130 may be slidably inserted into the corresponding recess 140 and may be coupled to the recess 140 by an interference or press fit. In other example embodiments, each protrusion 130 may be removably coupled to its corresponding recess 140 through the use of a snap fit, locking pin, slide latch, spring detent or other mechanism. In addition or in the alternative, in certain example embodiments, the primary base 110 may include a removable base receiver (e.g., an aperture or indentation along a top surface 128 of the primary base 110) having a size and shape that may correspond with the size and shape of a removable base positioning boss (similar to that described with reference to FIGS. 4A-7) disposed along a bottom side 138 of the removable base 120. In one example, due to the corresponding shapes and sizes, at least a portion of the removable base positioning boss can be set into or otherwise inserted into the removable base receiver and the combination will limit or substantially prevent the removable base 120 from moving laterally with respect to the primary base 110. The positioning boss may be integrally formed with the removable base 120 and molded as a single component, or may be a separate component attached to the removable base 120. The receiver and positioning boss may be used for alignment, or may include features for securing the removable base 120 to the primary base 110. The positioning boss 160 may protrude from the bottom surface of the removable base 120.

In other example embodiments, the male and female components of the removable base 120 and primary base 110 can be reversed. Additional methods may be used in place of or in addition to the elements listed above to align and couple or decouple the removable base 120 from the primary base 110. For example, a quarter-turn fastener or quarter-turn keyhole device may pass through the removable base 120 and be captured by a corresponding receiver in the primary base 110. Other example embodiments may utilize plastic detents or snaps that may selectively secure the removable base 120 to the primary base 110 without the need for the use of tools by the parent or guardian. Further, certain example embodiments may include male and female interlocking components on both the removable base 120 and primary base 110. In some example embodiments, spring-loaded plungers may be utilized to couple the removable base 120 to the primary base 110. In another example embodiment, the removable base 120 may have catches or receivers that mate with corresponding snaps or plungers mounted to the primary base 110 when the removable base 120 is disposed upon and abuts at least a portion of a top surface 128 of the primary base 110 at an angle and rotated to engage the snaps or plungers. The removable base 120 may also include one or more slots that may correspond to one or more rails, tabs, or protrusions in the primary base 110, that allow the removable base 120 to be slidably mounted onto the rails or protrusions on the primary base 110. Alternatively, hinged catches may be mounted on the removable base 120 or the primary base 110 that can be used to selectively latch the removable base to the primary base.

In some example embodiments, the removable base 120 includes the top surface 34, armrests 20, and lap belt guides 26, which stay with the removable base 120 when it is detached from the primary base 110 portion of the seat base (as shown in FIG. 3). In another example (not shown), the armrests 20 may be configured such that half or a portion of each armrest 20 is coupled to and remains with the removable base 120 and the remaining portion of each armrest 20 is coupled to and remains with the primary base 110. In this example embodiment, each partial armrest can function as an armrest for the child's arms, when the child is sitting on the removable base 120 or the primary base 110. Each of these partial arm rests can also include the lap belt guide 26 to guide the lap belt portion of the seat belt across the child's lap when in use.

In another example embodiment, and as explained more fully below, additional protrusions from the primary base 110 may serve as the armrest and lap belt guide for the primary base 110 when the removable base 120 is decoupled from the primary base 110 and the primary base 110 is used as the booster seat for the child without the removable base 120. In other examples, additional removable armrests 20 and lap belt guides 26 may be installed on the primary base 110 after the removable base 120 is detached from the primary base 110. Alternatively, the armrests 20 and lap belt guides 26 may be removable from the removable base 120 for installation on the primary base 110 when the primary base 110 is used alone.

Figure 4A:
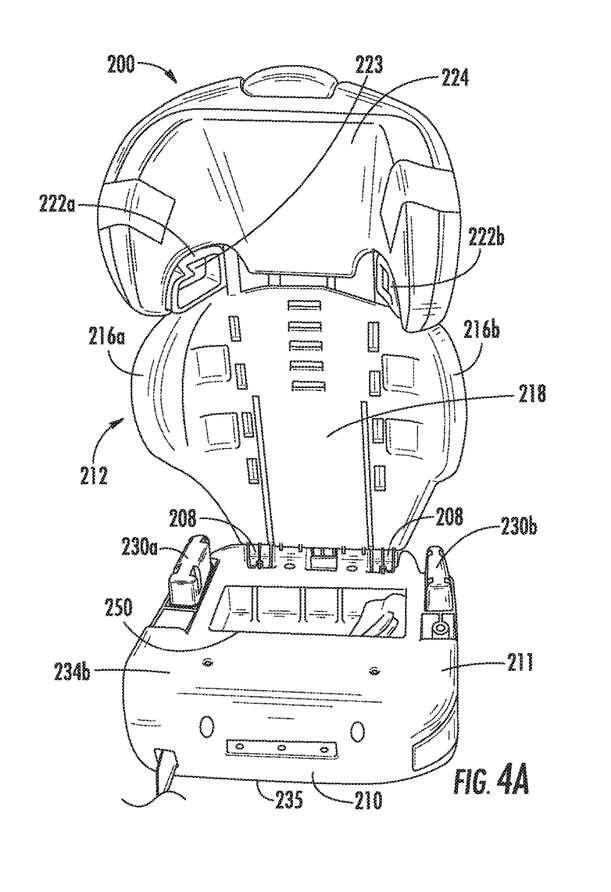
FIGS. 4A and 4B are front perspective views of another example embodiment of a child safety seat with removable base constructed in accordance with one example embodiment of the disclosure.
Figure 4B:
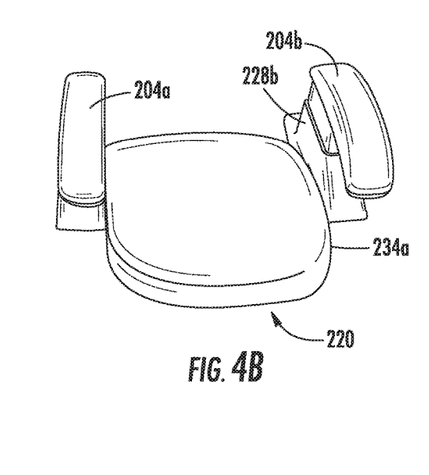
Figure 5:
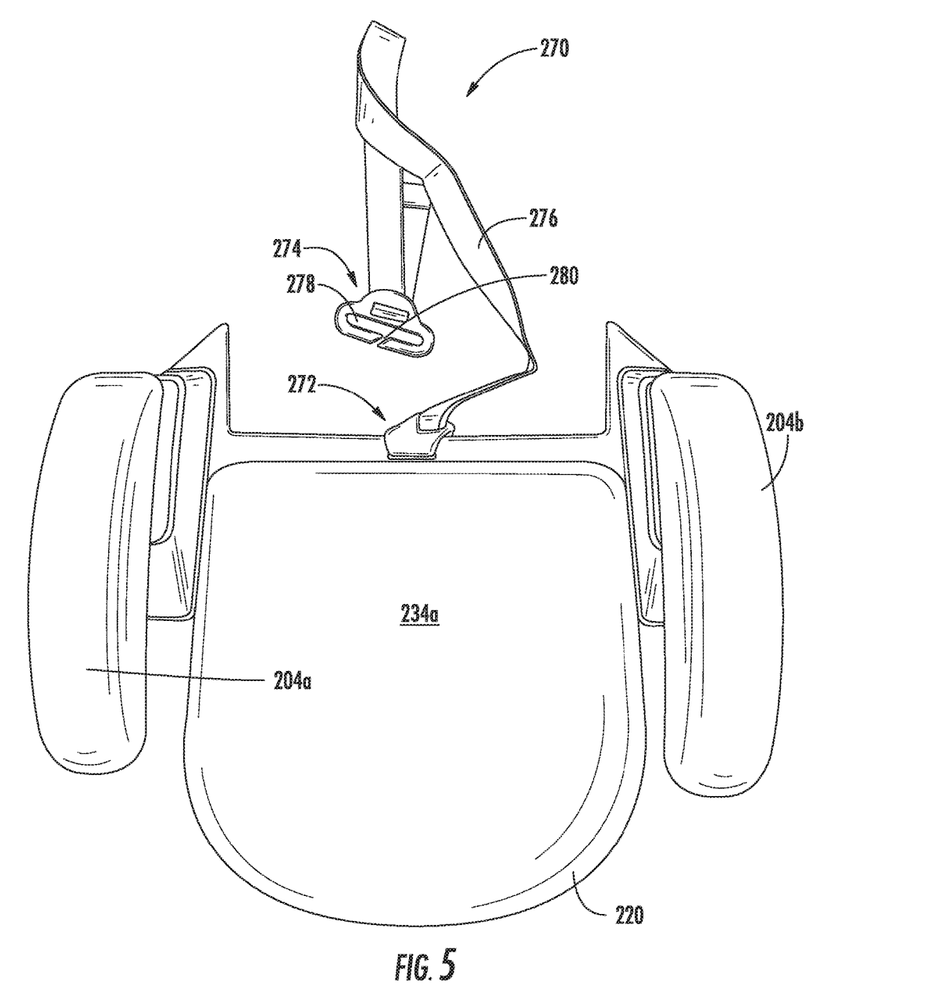
FIG. 5 is a top plan view of one example of a removable base for use with the child safety seats of FIGS. 1-4B constructed in accordance with one example embodiment of the disclosure.
Figure 7:
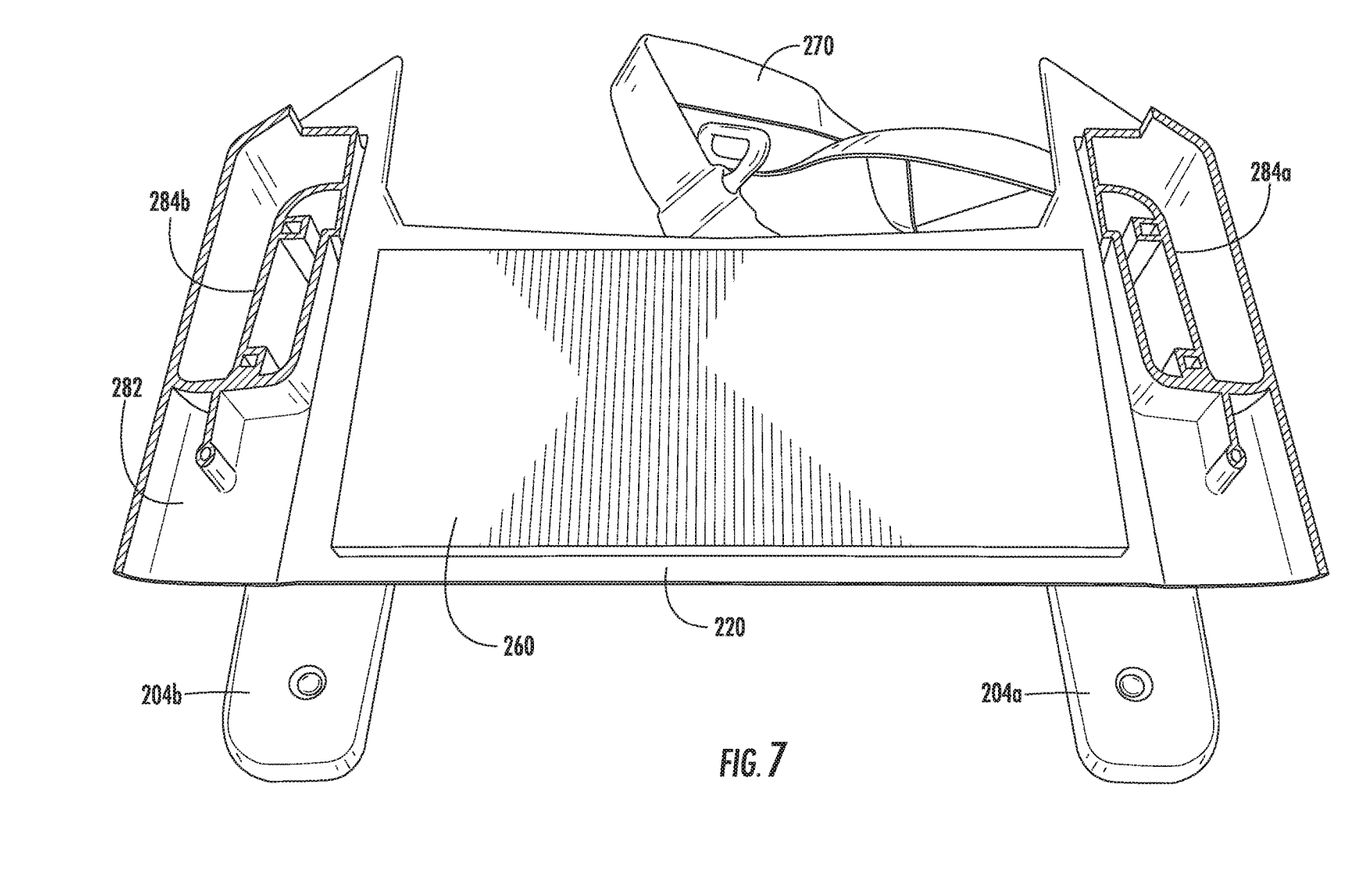
FIG. 7 is a bottom view of the removable base of FIGS. 5-6 constructed in accordance with one example embodiment of the disclosure.
Figure 8:
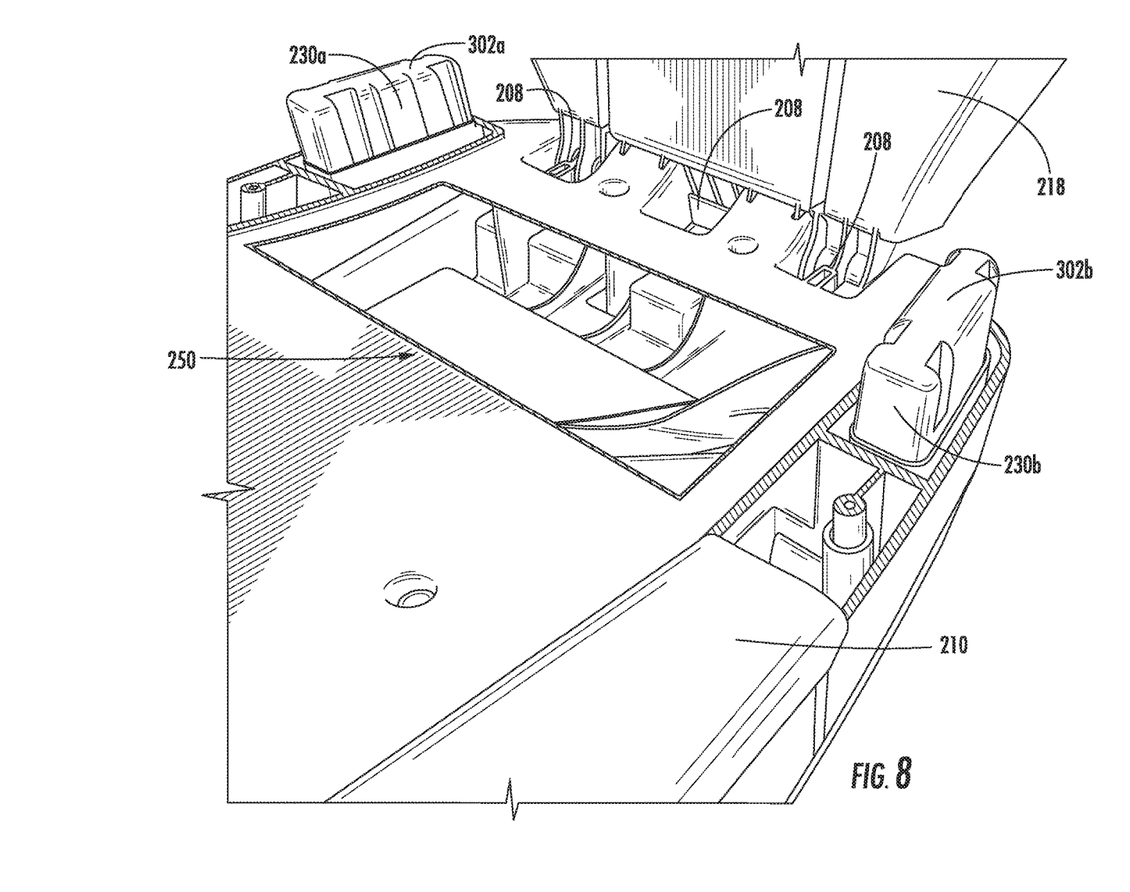
FIG. 8 is a partial perspective view of one example of a primary seat base of FIG. 5 constructed in accordance with one example embodiment of the disclosure.

FIGS. 4A and 4B are front perspective views of another example embodiment of a child safety seat 200 with removable base constructed in accordance with one example embodiment of the disclosure. FIG. 5 is a top plan view of one example of a removable base for use with the child safety seats of FIGS. 1-4B constructed in accordance with one example embodiment of the disclosure. FIG. 6 is a side elevation view of the removable base of FIG. 5 constructed in accordance with one example embodiment of the disclosure. FIG. 7 is a bottom view of the removable base of FIGS. 5-6 constructed in accordance with one example embodiment of the disclosure. FIG. 8 is a partial perspective view of one example of a primary seat base of FIG. 5 constructed in accordance with one example embodiment of the disclosure. Now referring to FIGS. 4A-8, the child safety seat 200 is substantially similar to the child safety seat 10 described with reference to FIGS. 1-3 and can include a seat back 212 and seat base 210. In some example embodiments, the seat back 212 and seat base 210 may be formed from two or more separate pieces that are joined together during manufacturing. The seat back 212 may be fixedly, removably, and/or rotatably coupled to the seat base 210.

The seat base 210 can include a primary base 211 and a removable base 220 that can be removably coupled to the primary base 211 to together make up the seat base 210. The seat base can include a top surface 234a and 234b and an opposing bottom surface 235. The bottom surface 235 can be configured to rest upon the top surface of the vehicle seat. A portion of the top surface 234a can be part of the removable base 220 while another portion of the top surface 234b can be part of the primary base 211 such that the removable base 220 is insertable into the primary base 211 to create a unitary top surface 234. The top surface 234a-b is configured to be sat upon by a child. The top surface 234a-b can be angled downward from front to back to better position the child within the child safety seat 200. All or a portion of the top surface 234a-b can also be covered in padding and/or soft goods (e.g., fabric, vinyl, plastic, leather, faux leather, etc.) to increase the comfort of the top surface of the seat base 210.

The seat back 212 can include a backrest 218 that extends generally vertically upward with respect to the seat base 210. The backrest 218 can include a front side and opposing back side. The front side of the backrest 218 can be configured to receive a portion of a child's back thereon. All or a portion of the backrest 218 can include padding and/or soft goods (e.g., fabric, vinyl, plastic, leather, faux leather, etc.) to increase the comfort of the front side of the backrest 218.

In some example embodiments, the seat back 212 may include a pair of lateral supports 216a and 216b. Each lateral support 216a-b can be positioned along opposing, vertically extending side edges of the seat back 212. In one example embodiment, each lateral support 216a-b is integrally formed with the seat back 212. Alternatively, each lateral support 216a-b can be separately formed an coupled to the seat back 212. Each lateral support 216a-b can extend along a portion of the vertical edge of the seat back 212 and generally between the seat base 210 and the headrest 224. Each lateral support 216a-b can also extend from the backrest 218 of the seat back 212 and generally forward from the front-facing portion of the backrest 218 to help keep the child securely positioned within the outer boundaries of the child safety seat 200 during lateral acceleration or deceleration.

In addition, the child safety seat 200 can also include a pair of armrests 204a and 204b. In some example embodiments, each armrest 204a-b may be coupled to the seat base 210 and can extend generally vertically upward from the seat base 210. In certain example embodiments, each armrest 204a-b can be positioned along opposing lateral sides of the seat base 210 (e.g., along opposing lateral sides of the removable base 220). In one example, each armrest 204a-b can include a vertical support member 228a and 228b that has a first end coupled to the seat base 210 (e.g., coupled to the removable base 220) and extends vertically upwardly from the seat base 210. Each armrest 204a-b can further include a horizontal support member 242a and 242b, respectively, coupled to or integrally formed with the vertical support member 228a-b. Each example horizontal support member 242a-b can be positioned along the top end of the corresponding vertical support member 228a-b and extend horizontally out therefrom to provide a larger contact area for the child's arm to rest on. In one example, each horizontal support member 242a-b can be vertically adjustable with respect to the corresponding vertical support member 228a-b to allow the armrest 204a-b to be raised and lowered.

In addition, the horizontal support member 242a-b can include padding and/or soft goods 292 (e.g., fabric, vinyl, plastic, leather, faux leather, etc.) at least along the top side of each horizontal support member 242a-b to provide additional comfort. In alternative example embodiments, the armrests 204a-b may be coupled to the seat back 212 and extend generally forward from the seat back 212.

The child safety seat 200 may also include elements that guide and position the vehicle's three-point seatbelt (not shown). In one example embodiment, the child safety seat 200 includes one or more shoulder belt guides 222a and 222b. Each shoulder belt guide 222a-b can be positioned along the seat back 212 near or adjacent the headrest 224 and generally above the corresponding lateral support 216a-b so as to be positioned near each of the occupant's shoulders as shown in FIG. 4A. Each shoulder belt guide 222a-b may be coupled to or integrally formed with the seat back 212, the backrest 218, or the headrest 224 and can be positioned between the bottom of the seat back 212 and the top of the seat back 212. Each shoulder belt guide 222a-b may include a channel 223, for example an oblong channel, that the seatbelt can pass freely therethrough. In some example embodiments, the outer wall of each shoulder belt guide 222a-b may have an opening or other break in the wall to allow the seatbelt to be fed into the channel 223 of the shoulder belt guide 222a-b while making it difficult for the belt to be unintentionally removed from the guide 222a-b. Once the seatbelt is in place within the channel 223 of the shoulder belt guide 222a-b, the shoulder belt guide 222a-b can maintain the shoulder belt in the proper position across the child's torso while still allowing the belt to be extended and retracted during buckling and unbuckling of the child into the child safety seat 200. Other example embodiments of the child safety seat 200 may utilize different shoulder belt guide configurations. For example, a strap with one end fixed to the child safety seat 10 may be looped over the seatbelt with the other end removably snapped or coupled to the child safety seat 200. In other example embodiments, the shape of the headrest 224, backrest 218, and/or lateral supports 216 may provide an integrated pathway to guide and secure the shoulder belt.

The child safety seat 200 may also include one or more lap belt guides 26. Each lap belt guide 26 is configured to properly position the lap belt across the lap of the child when the child is sitting on the seat base 210 of the child safety seat 200. In certain example embodiments, each lap belt guide 26 is positioned adjacent to a corresponding armrest 204a-b and along the top surface 234a-b of the seat base 210. In one example, each lap belt guide 26 creates a transition surface between a forward surface of the corresponding vertical support 228a-b of the armrest 204a-b and a top surface 234a of the seat base 210 for properly positioning the lap belt (not shown) across the lap of the child. In some example embodiments, each lap belt guide 26 may be attached to or integrally formed as a part of the corresponding vertical support 228a-b of the armrest 204a-b. In other example embodiments, each lap belt guide 26 may be attached to or integrally formed with at least a portion of the seat base 210 (e.g., the removable base 220). In another example embodiment, elements of the seat base 210 and vertical support 228a-b may combine to create the seat belt guide (for example, as shown in FIG. 6). In one example embodiment, the lap belt guide 26 may include a flat surface the belt extends over and abuts. In another example embodiment, the lap belt guide 26 may include additional features to secure or otherwise direct the lap belt.

In certain example embodiments, the seat back 212 may be adjustable to fit different occupants and vehicles. In one example, the seat back 212 may include a vertically adjustable headrest 224 that may be slidably or otherwise vertically adjustably coupled to the backrest 218 to fit occupants of different heights. The headrest 224 can include a lever configured to decouple the headrest 224 from the seat back 212 and allow the headrest 224 to be vertically adjusted up or down with respect to the seat back 212. Releasing the lever can then allow the headrest 224 to lock in one of multiple vertical positions along the seat back 212.

The child safety seat 200 can also include a seat back 212 that is selectively pivotally attached to the seat base 210 (e.g., the primary base 211), allowing the seat back 212 to be reclined at different seat back angles with respect to the seat base 210. In certain example embodiments, the seat back 212 and seat base 210 may be selectively removable, allowing the seat base 210 to be separated from the seat back 212 so that the seat base 210 can be used as a booster seat without the seat back 212. For example, the seat back 212 may include one or more hooks 208 positioned along a bottom edge of the seat back 212 for removably and rotatably coupling the seat back 212 to the seat base 210. The seat base 210 can include one or more corresponding pins, bars, or axles (not shown) positioned along a back edge of the seat base 210 to which the one or more hooks 208 of the seat back 212 can rotatably couple.

As discussed above and shown in FIGS. 4A-B, the seat base 210 can be manually separated by a user into two parts: a primary base 211 and a removable base 220. In the example embodiment of FIGS. 4A-8, the removable base 220 can be only a portion of the overall seat base 210 and has a more compact size than the combined primary base 211 and removable base 220. The removable base 220 has a shorter vertical profile than the combined primary base 211 and removable base 220, and the removable base 220 has a shorter seat depth profile than the primary base 211.

In one example embodiment, the primary base 211 can include one or more protrusions 230a and 230b that extend vertically upward from a top surface of the primary base 211. In one example, each protrusion 230a-b includes a top end 302a and 302b respectively, that are configured to be inserted into a corresponding portion of the removable base 220. The removable base 220 can include one or more corresponding recesses 284a and 284b, cavities, or openings positioned along a bottom side 282 of the removably base 220. All or a portion of each protrusion 230a-b, including the top ends 302a-b of each, can mate with or otherwise be inserted into the corresponding recesses 284a-b disposed along a bottom side 282 of the removable base 220. For example, the recesses 284a-b may be positioned under or adjacent to the armrests 204a-b. For example, each recess 284a-b may be part of the corresponding vertical support member 228a-b for the armrests 204a-b. In certain example embodiments, the protrusions 230a-b may be used for aligning the removable base 220 onto the primary base 211 for coupling and decoupling the removable base 220 to the primary base 211.

In certain example embodiments, the protrusions 230a-b may also include features for securing the removable base 220 to the primary base 211. For example, each protrusions 230a-b and corresponding recesses 284a-b may be correspondingly sized and shaped so that each protrusion 230a-b may be slidably inserted into the corresponding recess 284a-b and may be coupled to the recess 284a-b by an interference or press fit. In other example embodiments, each protrusion 230a-b may be removably coupled to its corresponding recess 284*a-b* through the use of a snap fit, locking pin, slide latch, spring detent or other mechanism. In addition or in the alternative, in certain example embodiments, the primary base 211 may include a removable base receiver 250 (e.g., an aperture or indentation along a top surface of the primary base 211) having a size and shape that may correspond with the size and shape of a removable base positioning boss 260 disposed along a bottom side 282 of the removable base 220. In one example, due to the corresponding shapes and sizes, at least a portion of the removable base positioning boss 260 can be set into or otherwise inserted into the removable base receiver 250 and the combination will limit or substantially prevent the removable base 220 from moving laterally with respect to the primary base 211. The positioning boss 260 may be integrally formed with the removable base 220 and molded as a single component, or may be a separate component attached to the removable base 220. In one example, embodiment, the positioning boss 260 has a flat or substantially flat bottom surface to allow for the removable base 220 to sit in a flat or substantially flat orientation along the top side of the vehicle seat. The receiver 250 and positioning boss 260 may be used for alignment, or may include features for securing the removable base 220 to the primary base 211. In one example embodiment, the positioning boss 260 may protrude slightly from the bottom surface of the removable base 220.

In other example embodiments, the male and female components of the removable base 220 and primary base 211 can be reversed. Additional methods may be used in place of or in addition to the elements listed above to align and couple or decouple the removable base 220 from the primary base 211. For example, a quarter-turn fastener or quarter-turn keyhole device may pass through the removable base 220 and be captured by a corresponding receiver in the primary base 211. Other example embodiments may utilize plastic detents or snaps that may selectively secure the removable base 220 to the primary base 211 without the need for the use of tools by the parent or guardian. Further, certain example embodiments may include male and female interlocking components on both the removable base 220 and primary base 211. In some example embodiments, spring-loaded plungers may be utilized to couple the removable base 220 to the primary base 211. In another example embodiment, the removable base 220 may have catches or receivers that mate with corresponding snaps or plungers mounted to the primary base 211 when the removable base 220 is disposed upon and abuts at least a portion of a top surface of the primary base 211 at an angle and rotated to engage the snaps or plungers. The removable base 220 may also include one or more slots that may correspond to one or more rails, tabs, or protrusions in the primary base 211, that allow the removable base 220 to be slidably mounted onto the rails or protrusions on the primary base 211. Alternatively, hinged catches may be mounted on the removable base 220 or the primary base 211 that can be used to selectively latch the removable base to the primary base.

In some example embodiments, the removable base 220 includes the top surface 234, armrests 204*a-b*, and lap belt guides 26, which stay with the removable base 220 when it is detached from the primary base 211 portion of the seat base (as shown in FIG. 6). As shown in FIG. 5, the removable base 220 can also include a shoulder belt strap 270 coupled to the removable base 220. The shoulder belt strap 270 may be configured to allow for the controlled location of the shoulder belt when the removable base 220 is used without the seat back 212 and the primary base 211. The shoulder belt strap 270 can include a strap or webbing portion 276 and a shoulder belt guide clip 274 coupled to the strap or webbing portion 276 and adjustable along the length of the strap or webbing portion 276. The shoulder belt strap 270 may connect at a first end 272 to the removable base 220. For example, a first portion of the strap 276 may be coupled along a back edge of the removable base 220. A distal second end of the shoulder belt strap 270 can be connected to the shoulder belt guide clip 274 for clipping to or capturing at least a portion of the shoulder belt. In some example embodiments, the length of the strap 276 may be adjustable to allow for fine tuning of the shoulder belt placement across the child's body when the child sits upon the removable base 220.

In certain example embodiments, the strap 276 can attach to the removable base 220 by fasteners, by tying the strap 276 to a portion of the removable base 220, or by fitting at least a portion of the strap 276 through an opening in the removable base 220 and securing the strap 276 by snapping, heat welding, or otherwise securing the free end of the strap 276 to itself. The shoulder belt guide clip 274 can include an opening 278 or passageway through the shoulder belt guide clip 274. In addition, the shoulder belt guide clip 274 can include an opening 280 through an outer wall of the shoulder belt guide clip 174 through which the shoulder belt may be passed. The shoulder belt guide clip 274 may also have a second opening for use in attaching the shoulder belt guide clip 274 to the strap 276. In one example, the shoulder belt guide clip 274 may be attached to the strap 276 with a fastener or snap, or the strap 276 may pass through the second opening in the shoulder belt guide clip 274 and snap, heat weld, or otherwise secure the second free end of the strap 276 to itself.

The removable base 120, 220 may include features to allow the removable base 120, 220 to be configured in a more compact form for transportation. For example, the armrests 20, 204*a-b* on the removable base 120, 220 may include telescoping vertical supports 28, 228*a-b* that collapse when the parent or guardian activates a latch, button, or pin mechanism unlocking the armrest 20, 204*a-b*. In another example embodiment, the armrests 20, 204*a-b* may be foldably coupled to the removable base 120, 220. In such a configuration, the armrests 20, 204*a-b* may fold and lay flat against the top surface or bottom surface of the removable base 120, 220 reducing its overall profile. Similarly, the removable base 120, 220 may include features to allow the overall profile to be reduced. In one example, the removable base 120, 220 may include one or more hinges disposed along the surface of the removable base 120, 220 so that the removable base 120, 220 may fold at one or more points. For example, a hinge may be provided along the midline of the removable base 120, 220 that allows the removable base 120, 220 to be folded along that midline. In another example, the removable base 120, 220 may collapse or telescope from one side to another reducing the overall width of the seat when prepared for storage.

Though the disclosed example includes a particular arrangement of a number of parts, components, features, and aspects, the disclosure is not limited to only that example or arrangement. Any one or more of the parts, components, features, and aspects of the disclosure can be employed alone or in other arrangements of any two or more of the same.

Although certain child safety seat, removable and primary seat base, seat back, securement, adjustment mechanism, or seat belt guide features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A child safety seat comprising:
   a seat back;
   a seat base removably coupled in its entirety to the seat back, the seat base comprising:
      a primary base; and
      a removable base removably coupled to the primary base the removable base comprising:
         a seating surface configured to receive a child thereon;
         a bottom surface opposite the seating surface;
         a first left armrest coupled to the removable base and rotatable with respect to the removable base and configured to rotate from a first stored position along the bottom surface to a use position along a first side of the removable base; and
         a first right armrest coupled to the removable base and rotatable with respect to the removable base and configured to rotate from a second stored position along the bottom surface to a use position along a second side of the removable base opposite the first side; and
      wherein the removable base is configured to be used as a first booster seat when detached from the primary base, with the bottom surface resting on a vehicle seat and the primary base is configured to be used as a second booster seat when the removable base is detached from the primary base.

2. The child safety seat of claim 1, further comprising at least one seatbelt guide disposed along the seat base wherein each seatbelt guide is configured to position a lap belt of a three-point car seatbelt.

3. The child safety seat of claim 2, further comprising a second left armrest and a second right armrest, wherein the second left armrest and the second right armrest are coupled directly to the primary base.

4. The child safety seat of claim 3, wherein the at least one seatbelt guide is disposed between the second left armrest and a top surface of a seating surface of the primary base.

5. The child safety seat of claim 4, wherein a second seatbelt guide of the at least one seatbelt guide is disposed between the second right armrest and the top surface of the seating surface of the primary base.

6. The child safety seat of claim 1, wherein the removable base comprises a bottom surface and wherein the bottom surface of the removable base is substantially flat.

7. The child safety seat of claim 1, further comprising a first shoulder seatbelt guide disposed on the seat back and configured to position a shoulder belt portion of the three-point car seatbelt.

8. The child safety seat of claim 7, wherein the child safety seat further comprises an adjustable shoulder seatbelt guide strap coupled to the removable base.

9. The child safety seat of claim 1, wherein the removable base comprises a plurality of protrusions, wherein the primary base comprises a plurality of recesses, and wherein each of the plurality of protrusions is removably inserted into a corresponding one of the plurality of recesses.

10. The child safety seat of claim 1, wherein the primary base comprises a aperture disposed along a top surface of the primary base and wherein the removable base comprises a boss disposed along a bottom side of the removable base, wherein the boss is removably inserted into the aperture to removably couple the removable base to the primary base.

11. The child safety seat of claim 1, wherein the primary base comprises a first seat depth and wherein the removable base comprises a second seat depth, wherein the first seat depth is greater than the second seat depth.

12. The child safety seat of claim 1, wherein the removable base folds at a midpoint of the removable base.

13. The child safety seat of claim 1, wherein the removable base is disposed along a top side of the primary base when the removable base is coupled to the primary base and wherein the seating surface of the removable base is a portion of a second seating surface of the primary base.

14. A child safety seat comprising:
   a seat back;
   a seat base removably coupled to the seat back, the seat base comprising:
      a primary base;
      a removable base removably coupled to the primary base, the removable base comprising:
         a seating surface configured to receive a child thereon;
         a bottom surface opposite the seating surface;
         a left armrest coupled to the removable base and rotatable with respect to the removable base from a first stored position along the bottom surface to a use position along a left side of the removable base;
         a right armrest coupled to the removable base and rotatable with respect to the removable base from a second stored position along the bottom surface to a second use position along an opposing right side of the removable base;
         a first lap belt guide disposed between the left armrest and the seating surface of the removable base; and
         a second lap belt guide disposed between the right armrest and the seating surface;
      wherein the removable base is configured to be used as a first booster seat when detached from the primary base with the bottom surface resting on a vehicle seat and the primary base is configured to be used as a second booster seat when the removable base is detached from the primary base.

15. The child safety seat of claim 14, wherein the removable base further comprises an adjustable shoulder belt guide strap comprising a flexible strap comprising a first end coupled to the removable base and a second distal end coupled to a shoulder belt guide clip, the shoulder belt guide clip configured to selectively couple with a shoulder belt portion of a three-point car seatbelt and allow the shoulder belt to pass therethrough.

16. The child safety seat of claim 14, wherein the primary base further comprises a second left armrest, a second right armrest, and a third lap belt guide.

17. The child safety seat of claim 14, wherein the removable base is disposed along a top side of the primary base when the removable base is coupled to the primary base and wherein the seating surface of the removable base is a portion of a second seating surface of the primary base.

18. A child safety seat comprising:
   a seat back;
   a seat base removably coupled in its entirety to the seat back, the seat base comprising:
      a primary base; and
      a removable base removably coupled to the primary base, the removable base comprising:
         a seating surface configured to receive a child thereon;
         a bottom surface opposite the seating surface;
         a first left armrest coupled to the removable base and rotatable with respect to the removable base and configured to rotate from a first stored position along the bottom surface to a use position along a first side of the removable base; and
         a first right armrest coupled to the removable base and rotatable with respect to the removable base and configured to rotate from a second stored position along the bottom surface to a use position along a second side of the removable base opposite the first side;
   a first coupling means for removably coupling the seat back to the seat base; and
   a second coupling means for removably coupling the removable base to the primary base;
   wherein the removable base is configured to be used as a first booster seat when detached from the primary base with bottom surface resting on a vehicle seat and the primary base is configured to be used as a second booster seat when the removable base is detached from the primary base.

19. The child safety seat of claim 18, wherein the removable base is disposed along a top side of the primary base when the removable base is coupled to the primary base and wherein the seating surface of the removable base is a portion of a second seating surface of the primary base.

* * * * *